(12) United States Patent
Matsushita

(10) Patent No.: US 10,421,327 B2
(45) Date of Patent: Sep. 24, 2019

(54) SUSPENSION SYSTEM

(71) Applicant: HONDA MOTOR CO., LTD., Tokyo (JP)

(72) Inventor: Kosuke Matsushita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 15/886,176

(22) Filed: Feb. 1, 2018

(65) Prior Publication Data

US 2018/0215222 A1 Aug. 2, 2018

(30) Foreign Application Priority Data

Feb. 2, 2017 (JP) .................. 2017-017517

(51) Int. Cl.
| | | |
|---|---|---|
| *B60G 7/00* | (2006.01) | |
| *B60G 9/02* | (2006.01) | |
| *B60G 3/18* | (2006.01) | |
| *B60G 3/20* | (2006.01) | |
| *B60G 21/055* | (2006.01) | |

(52) U.S. Cl.
CPC ............... *B60G 7/001* (2013.01); *B60G 3/18* (2013.01); *B60G 3/20* (2013.01); *B60G 9/02* (2013.01); *B60G 21/0551* (2013.01); *B60G 2200/141* (2013.01); *B60G 2200/462* (2013.01); *B60G 2200/4622* (2013.01); *B60G 2204/1224* (2013.01)

(58) Field of Classification Search
CPC ........ B60G 2200/141; B60G 2200/462; B60G 2200/4622; B60G 21/055; B60G 21/0551; B60G 2204/1224; B60G 7/001; B60G 3/06; B60G 3/14; B60G 3/18; B60G 3/20; B60G 9/02

See application file for complete search history.

(56) References Cited

U.S. PATENT DOCUMENTS

| | | | | |
|---|---|---|---|---|
| 3,603,422 A | * | 9/1971 | Cordiano | ................. B60G 3/24 180/359 |
| 4,039,205 A | * | 8/1977 | Castanier | ............... B60G 3/145 280/124.109 |
| 4,798,397 A | * | 1/1989 | Komiya | ................. B60G 7/001 280/124.134 |
| 8,167,319 B2 | * | 5/2012 | Ogawa | ............... B60G 21/0553 280/124.106 |
| 9,849,743 B2 | * | 12/2017 | Kuwabara | .............. B60G 7/001 |

(Continued)

FOREIGN PATENT DOCUMENTS

| | | |
|---|---|---|
| EP | 0691225 A1 | 1/1996 |
| JP | 2014004952 A * | 1/2014 |

*Primary Examiner* — Laura Freedman
(74) *Attorney, Agent, or Firm* — Rankin, Hill & Clark LLP

(57) ABSTRACT

A suspension system includes: a trailing arm and a lower arm which are turnably connected to a chassis and are joined in such a way as to be displaceable relative to each other through a hinge mechanism; and a stabilizer. The suspension system includes a stabilizer link which connects the stabilizer to the trailing arm. A fitting point of the stabilizer link to the trailing arm is located behind a center axis of the hinge mechanism in a vehicle front-back direction, and a fastening point of the stabilizer and the stabilizer link is located above the fitting point in a vehicle up-down direction and inside the fitting point in a vehicle width direction.

2 Claims, 5 Drawing Sheets

(56) References Cited

U.S. PATENT DOCUMENTS

2018/0079269 A1\* 3/2018 Yanagida ................. B60G 3/20
2018/0093541 A1\* 4/2018 Matsushita .............. B60G 3/20
2018/0215221 A1\* 8/2018 Matsushita ........ B60G 21/0551
2019/0047625 A1\* 2/2019 Kato ........................ B60G 3/18

\* cited by examiner

FIG. 1
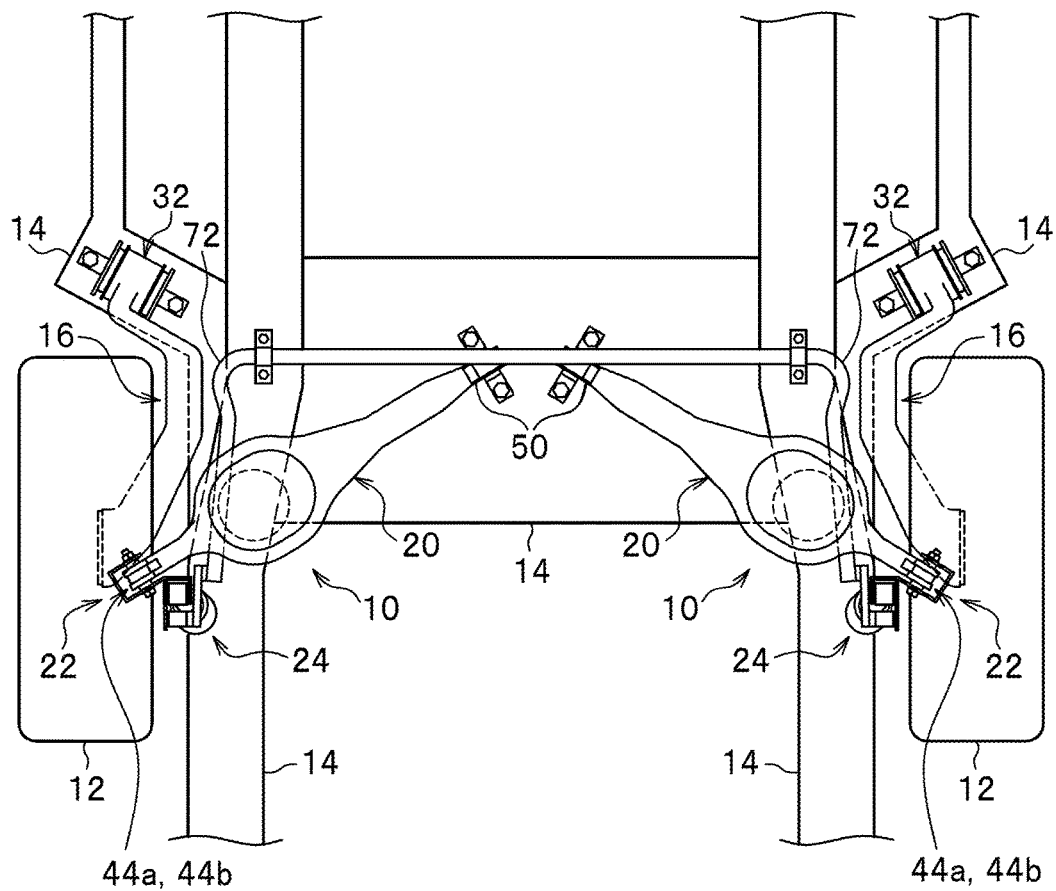
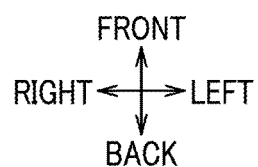

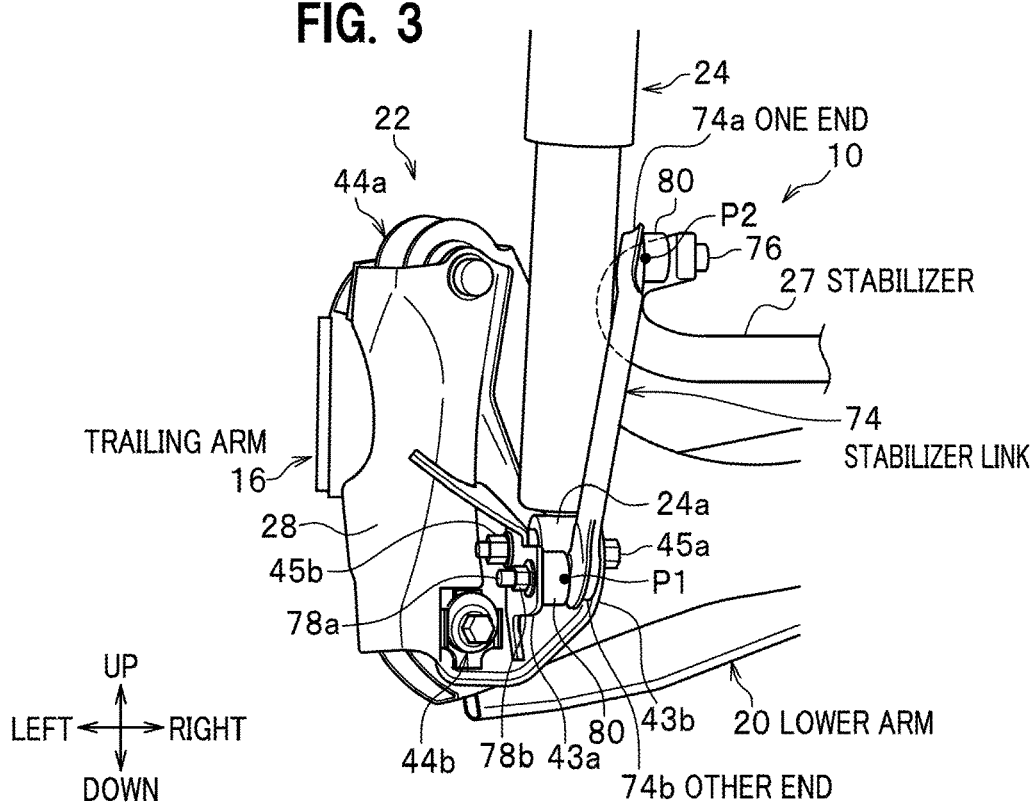
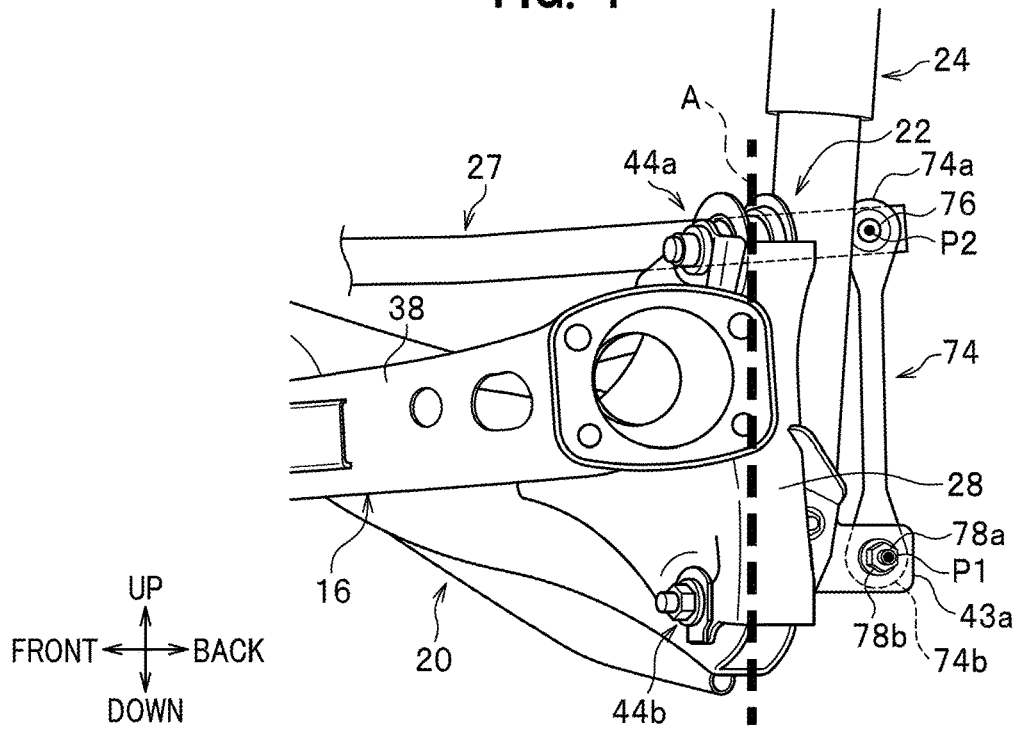

FIG. 7
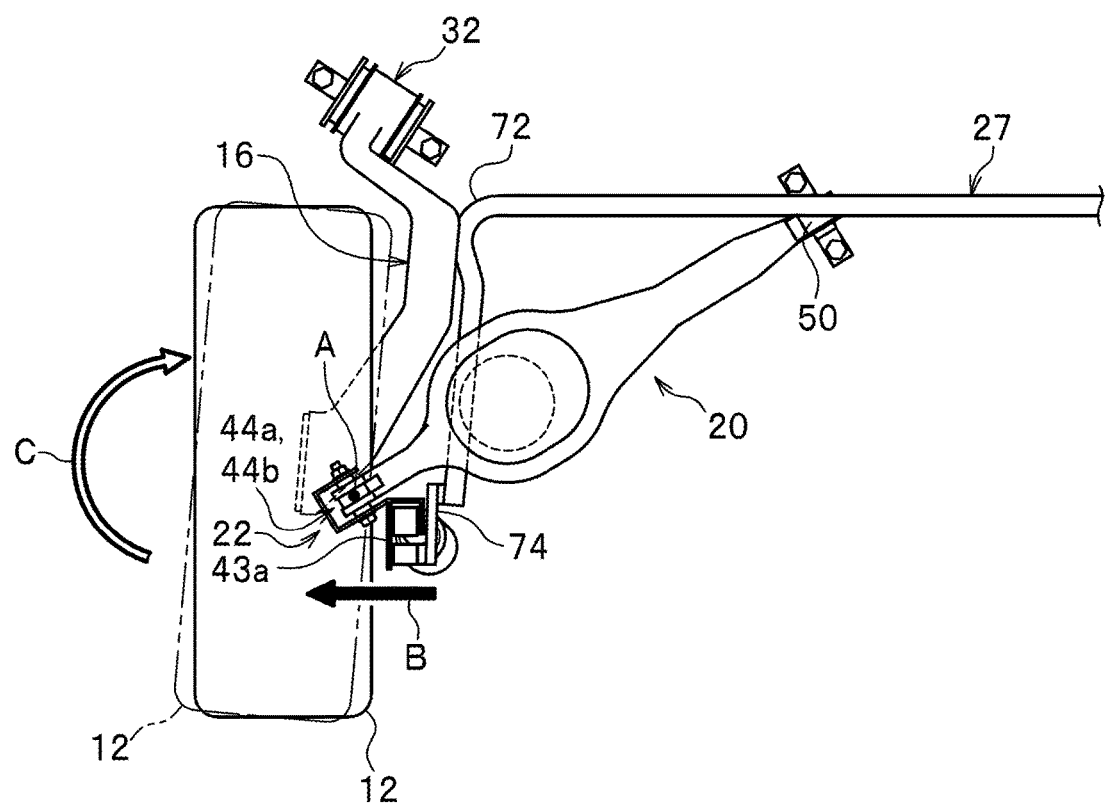
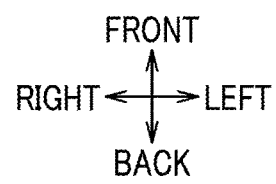

SUSPENSION SYSTEM

BACKGROUND OF THE INVENTION

1. Field of the Invention

The present invention relates to a semi-trailing arm suspension system.

Description of the Related Art

European Patent Publication No. 0691225 (Patent Document 1) discloses a semi-trailing arm suspension system constructed by splitting a trailing arm and a lower arm (a one-piece arm) in advance, for example. In this suspension system, a vehicle back end part of the trailing arm and an outer end part in a vehicle width direction of the lower arm are hinge-joined to each other with two rubber bushes.

Meanwhile, a vehicle front end part of the trailing arm is turnably fitted on a chassis through a trailing bush. An inner end part in the vehicle width direction of the lower arm is turnably fitted on the chassis through a lower arm bush. In this case, a suspension swinging axis (so called a semi-trailing axis) relative to the chassis is formed by a line joining a turning center point of the trailing arm (a center point of the trailing bush) to a turning center point of the lower arm (a center point of the lower arm bush).

SUMMARY OF THE INVENTION

Meanwhile, in the suspension system disclosed in Patent Document 1, a toe characteristic at the time of a suspension stroke (hereinafter referred to as a stroke toe characteristic) is determined by the suspension swinging axis (the semi-trailing axis) as with an ordinary semi-trailing arm suspension system.

For this reason, in the suspension system disclosed in Patent Document 1, if a desired layout space takes priority, for example, then the suspension swinging axis needs to be moved (by changing the turning center point of the lower arm to a front side of the vehicle, for instance) corresponding to the layout space. In this case, the suspension system disclosed in Patent Document 1 has a difficulty in obtaining a desired stroke toe characteristic due to deterioration of the required stroke toe characteristic. Note that examples of the desired layout space include spaces for locating a spare tire pan, a 4 WD differential gear train, a battery, and the like.

Moreover, in the suspension system disclosed in Patent Document 1, when taking into account a height dimension of a hip point of a rear seat, a height dimension of the rear seat (a seat face), and a cross-section depth dimension of a rear cross member, respectively, the suspension swinging axis needs to be moved (by changing the turning center point of the lower arm to a lower side of the vehicle, for instance) corresponding to dimensions that combine the various dimensions mentioned above. In this regard, the suspension system disclosed in Patent Document 1 has a difficulty in obtaining a desired stroke toe characteristic due to deterioration of the required stroke toe characteristic.

An object of the present invention is to provide a suspension system which is capable of improving a toe characteristic at the time of a suspension stroke by use of a reactive force of a stabilizer.

In order to achieve the above object, a semi-trailing arm suspension system according to the present invention includes a trailing arm turnably connected to a chassis; a trailing bush interposed between the chassis and the trailing arm and configured to pivotally and turnably support the trailing arm; a lower arm turnably connected to the chassis; a lower arm bush interposed between the chassis and the lower arm and configured to pivotally and turnably support the lower arm; a hinge mechanism configured to join the trailing arm and the lower arm in such a way as to be displaceable relative to each other; a shaft-shaped stabilizer provided with a bent part; and a stabilizer link interposed between the trailing arm and the stabilizer and configured to connect the stabilizer to the trailing arm, in which one end of the stabilizer link is fastened to an end part of the stabilizer and another end of the stabilizer link is fitted on the trailing arm, a fitting point of the stabilizer link to the trailing arm is located behind a center axis of the hinge mechanism in a vehicle front-back direction, and a fastening point of the stabilizer and the stabilizer link is located above the fitting point in a vehicle up-down direction and inside the fitting point in a vehicle width direction.

Moreover, a semi-trailing arm suspension system according to the present invention includes a trailing arm turnably connected to a chassis; a trailing bush interposed between the chassis and the trailing arm and configured to pivotally and turnably support the trailing arm; a lower arm turnably connected to the chassis; a lower arm bush interposed between the chassis and the lower arm and configured to pivotally and turnably support the lower arm; a hinge mechanism configured to join the trailing arm and the lower arm in such a way as to be displaceable relative to each other; a shaft-shaped stabilizer provided with a bent part; and a stabilizer link interposed between the trailing arm and the stabilizer and configured to connect the stabilizer to the trailing arm, in which one end of the stabilizer link is fastened to an end part of the stabilizer and another end of the stabilizer link is fitted on the trailing arm, a fitting point of the stabilizer link to the trailing arm is located behind a center axis of the hinge mechanism in a vehicle front-back direction, and a fastening point of the stabilizer and the stabilizer link is located below the fitting point in a vehicle up-down direction and inside the fitting point in a vehicle width direction.

According to the present invention, it is possible to provide a suspension system which is capable of improving a toe characteristic at the time of a suspension stroke by use of a reactive force of a stabilizer.

BRIEF DESCRIPTION OF THE DRAWINGS

FIG. 1 is a bottom view illustrating a state where a suspension system according to an embodiment of the present invention is applied to each of right and left rear wheels, which is viewed from immediately below a vehicle.

FIG. 3 is a front view of the suspension system applied to the left rear wheel, which is viewed from a front side of the vehicle.

FIG. 4 is a side view of the suspension system applied to the left rear wheel, which is viewed from a left side in a vehicle width direction.

FIG. 7 is a bottom view used for explanation of operation of the suspension system according to the embodiment.

DETAILED DESCRIPTION OF THE EMBODIMENT

Next, an embodiment of the present invention will be described in detail with reference to the accompanying drawings as appropriate.

Figure 2:
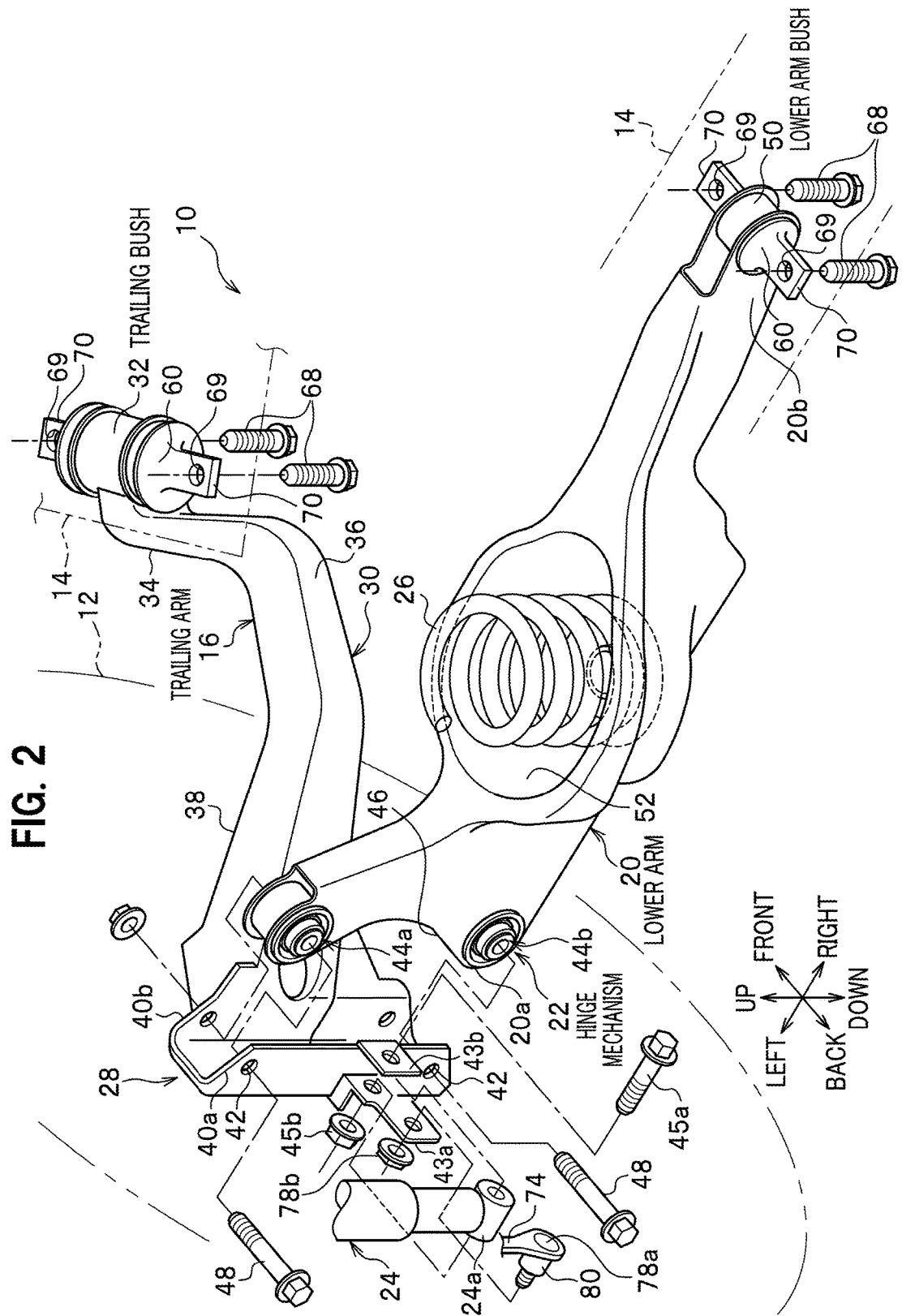
FIG. 2 is an exploded perspective view of the suspension system applied to the left rear wheel in FIG. 1.

FIG. 1 is a bottom view illustrating a state where a suspension system according to an embodiment of the present invention is applied to each of right and left rear wheels, which is viewed from immediately below a vehicle. FIG. 2 is an exploded perspective view of the suspension system applied to the left rear wheel in FIG. 1. Note that expressions "front" and "back" in the drawings indicate a vehicle front-back direction, expressions "right" and "left" therein indicate a vehicle width direction (a right-left direction), and expressions "up" and "down" therein indicate a vehicle up-down direction (a vertical up-down direction), respectively.

As shown in FIG. 1, a suspension system 10 is structured as an independent rear suspension system to be independently provided to each of a left rear wheel 12 and a right rear wheel 12 (hereinafter also referred to as wheels 12) and configured to rotatably support each of left and right rear wheels 12. Note that the rear suspension systems 10 having the same structure are provided to the right rear wheel 12 and the left rear wheel 12 in such a way as to form a symmetrical arrangement.

As shown in FIG. 2, each suspension system 10 includes a split semi-trailing arm suspension unit formed from: a trailing arm 16 pivotally and rotatably supporting the wheel (the left rear wheel) 12 through a not-illustrated vehicle axle and being turnably connected to a chassis 14; a lower arm 20 supporting a vehicle back part of the trailing arm 16; and a hinge mechanism 22 connecting (joining) the trailing arm 16 and the lower arm 20 in such a way as to be displaceable relative to each other.

The suspension system 10 further includes: a damper 24 and a spring 26 separately disposed in the trailing arm 16 and the lower arm 20, respectively; and a stabilizer 27 (see FIG. 1) which is held by the chassis 14 with a pair of fittings 25 (see FIG. 1) and suspends the left rear wheel 12 and the right rear wheel 12, respectively. The damper 24 is located on the outside in the vehicle width direction from the spring 26 and is also disposed at an outer end in the vehicle width direction (a left end in the vehicle width direction) of the lower arm 20 (see FIG. 2). Note that illustration of the stabilizer 27 is omitted in FIG. 2.

As shown in FIG. 2, the trailing arm 16 is formed from an arm body portion 28 located at a back end part in the vehicle front-back direction and provided with the hinge mechanism 22, and an arm portion 30 extending from the arm body portion 28 to the front of the vehicle. A trailing bush 32 for pivotally and turnably supporting the trailing arm 16 is fitted on a vehicle front end part of the arm portion 30.

The arm portion 30 is formed from: an L-shaped bent part 34 that is fitted on the trailing bush 32 and bent substantially into an L-shape in bottom view; a straight part 36 being continuous with the L-shaped bent part 34 and extending substantially straight in the vehicle front-back direction; and a crossing part 38 extending from the straight part 36 to the arm body portion 28, specifically, in bottom view, extending from the inside in the vehicle width direction to the outside in the vehicle width direction while crossing the vehicle front-back direction.

The arm body portion 28 includes a pair of opposed pieces 40a and 40b, which extend in the vehicle up-down direction and are opposed substantially parallel to each other. The pair of opposed pieces 40a and 40b protrude substantially inward in the vehicle width direction, respectively, and include bolt insertion holes 42 that are provided on upper and lower parts thereof.

Of the pair of opposed pieces 40a and 40b, a lower side of the opposed piece 40a on the back side of the vehicle is provided with attachments at which the damper 24 and a stabilizer link 74 to be described later are juxtaposed in the vehicle front-back direction. The attachment for the damper 24 is located on the front side of the vehicle while the attachment for the stabilizer link 74 is located on the back side of the vehicle. The attachment for the damper 24 includes two flanges 43a and 43b opposed to each other while having projecting lengths from the arm body portion 28 to the back of the vehicle which are different from each other, a bolt 45a to be inserted into bolt insertion holes formed in the two flanges 43a and 43b, and a nut 45b to be engaged with threads on the bolt 45a. The attachment for the stabilizer link 74 includes the flange 43a out of the two flanges 43a and 43b and supports the stabilizer link 74 in a cantilever fashion with (connects the stabilizer link 74 in a cantilever fashion to) the flange 43a. Here, the flange 43a is located outside the flange 43b (at the left end) in the vehicle width direction, and has the projecting length larger than that of the flange 43b. Although the two flanges 43a and 43b are provided integrally with the arm body portion 28 in this embodiment, the flanges 43a and 43b that are formed separately from the arm body portion 28 may be joined to the arm body portion 28 instead.

The damper 24 is configured to attenuate vibration transmitted from the wheel 12. A cylindrical portion 24a having a through-hole is provided at a lower end part of the damper 24. The damper 24 is fitted so as to be turnable relative to the trailing arm 16 and the lower arm 20 while using the bolt 45a that penetrates the through-hole in the cylindrical portion 24a as its turning center.

The lower arm 20 includes a vehicle width outer end part 20a and a vehicle width inner end part 20b. A pair of rubber bushes 44a and 44b located away by a prescribed distance from each other along the up-down direction are fitted on the vehicle width outer end part 20a. A recessed part 46, which is recessed substantially into a V-shape viewed from the back of the vehicle, is formed between the pair of rubber bushes 44a and 44b. The trailing arm 16 and the lower arm 20 are joined in such a way as to be displaceable relative to each other through a pair of bolts 48 that are inserted, respectively, into the pair of rubber bushes 44a and 44b as well as the bolt insertion holes 42 in the pair of opposed pieces 40a and 40b.

The hinge mechanism 22 is formed from: the pair of opposed pieces 40a and 40b provided to the arm body portion 28 of the trailing arm 16; the vehicle width outer end part 20a of the lower arm 20; the pair of rubber bushes 44a and 44b fitted on the vehicle width outer end part 20a; and the pair of bolts 48 that fasten the vehicle back end part of the trailing arm 16 and the vehicle width outer end part 20a of the lower arm 20 through the pair of rubber bushes 44a and 44b. Here, an imaginary line (see a thick dashed line in each of FIGS. 4 to 6B to be described later) that joins the center of the upper rubber bush 44a to the center of the lower rubber bush 44b defines a center axis A of the hinge mechanism 22.

A lower arm bush 50, which supports the lower arm 20 turnably relative to the chassis 14 (such as a cross member, see FIG. 1), is fitted on the vehicle width inner end part 20b of the lower arm 20.

A recessed part 52 having a composite shape formed by combining a substantially circular shape with a triangular shape in top view is formed between the vehicle width outer end part 20a and the vehicle width inner end part 20b of the lower arm 20 (see FIG. 2). The spring (a coil spring) 26 designed to exert a spring force is disposed in the recessed part 52.

The trailing arm 16 and the lower arm 20 are turnably fitted on the chassis 14 through the trailing bush 32 and the lower arm bush 50, respectively. A suspension movable axis (a swinging axis) is defined by joining a turning center point of the trailing arm 16 to a turning center point of the lower arm bush 50 with an imaginary line. The suspension movable axis is a turning axis of the suspension system 10 relative to the chassis 14.

As shown in FIG. 2, each of the trailing bush 32 and the lower arm bush 50 includes a shaft member 60. Flat plate pieces 70 having a pair of fitting holes 69 that allow insertion of bolts 68 are provided on two ends along an axial direction of each shaft member 60. The trailing bush 32 and the lower arm bush 50 are fitted on the chassis 14 by inserting the bolts 68 into the fitting holes 69. Here, the bolts 68 may be inserted directly to the inside of an inner cylinder member of the trailing bush 32 without using the flat plate pieces 70, and the trailing bush 32 may thus be turnably fitted on a not-illustrated bracket provided on the chassis 14.

FIG. 3 is a front view of the suspension system applied to the left rear wheel, which is viewed from a front side of the vehicle. FIG. 4 is a side view of the suspension system applied to the left rear wheel, which is viewed from a left side in the vehicle width direction.

The stabilizer 27 is formed from a shaft-shaped composite member having a bent part 72 (see FIG. 1). Moreover, the stabilizer 27 is provided with a stabilizer link 74 which connects the stabilizer 27 to the trailing arm 16.

As shown in FIGS. 3 and 4, the stabilizer link 74 is formed from a relatively long rod member having a substantially straight shape. One end (an upper end) 74a in an axial direction of the stabilizer link 74 is fastened to an end part of the stabilizer 27 through a bolt 76 and a not-illustrated nut. Another end (a lower end) 74b in the axial direction of the stabilizer link 74 is fitted on the trailing arm 16 (the flange 43a of the arm body portion 28) through a bolt 78a and a nut 78b. Stabilizing bushes 80 each having a ring shape are interposed between the trailing arm 16 and the stabilizer link 74 as well as between the stabilizer 27 and the stabilizer link 74, respectively.

Figure 5A:
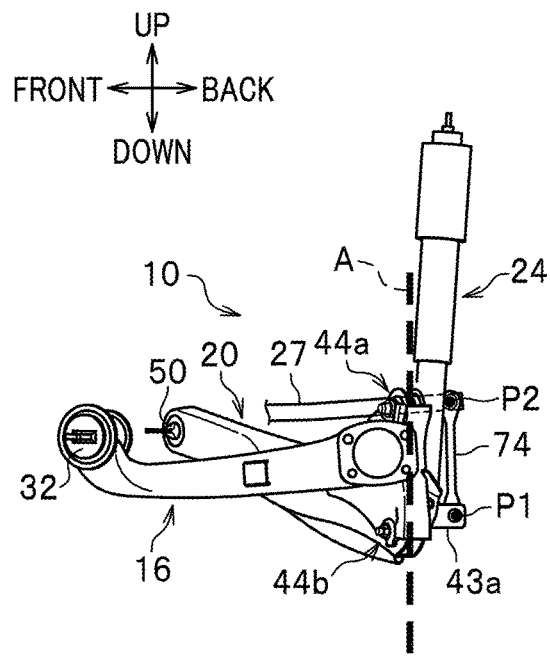
FIG. 5A is a schematic diagram of the suspension system of the embodiment, which shows a positional relation in a vehicle front-back direction between a center axis A of a hinge mechanism and a stabilizer link.
Figure 5B:
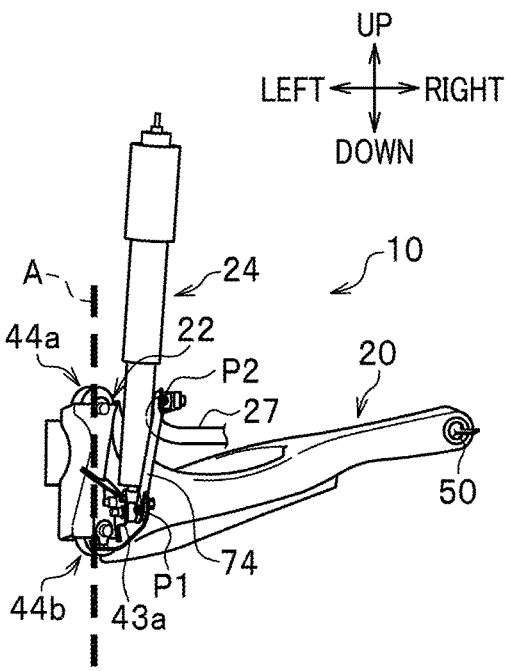
FIG. 5B is a schematic diagram of the suspension system of the embodiment, which shows a positional relation in the vehicle width direction between a fitting point P1 and a fastening point P2.

Regarding the suspension system 10 of this embodiment, FIG. 5A is a schematic diagram showing a positional relation in the vehicle front-back direction between the center axis A of the hinge mechanism and the stabilizer link, and FIG. 5B is a schematic diagram showing a positional relation in the vehicle width direction between a fitting point P1 and a fastening point P2.

In this embodiment, as shown in FIG. 5A, the fitting point P1 of the stabilizer link 74 to the trailing arm 16 (the flange 43a of the arm body portion 28) is located behind the center axis A (the imaginary line that joins the center point of the bush 44a to the center point of the bush 44b) of the hinge mechanism 22 in the vehicle front-back direction. Meanwhile, the fastening point P2 of the stabilizer 27 and the stabilizer link 74 is located above the fitting point P1 in the vehicle up-down direction and inside the fitting point P1 in the vehicle width direction (a right side in the vehicle width direction) as shown in FIG. 5B. In other words, the stabilizer link 74 is disposed such that the other end (the lower end) 74b side of the stabilizer link 74 is located outside (on the left side in the vehicle width direction) of the one end (the upper end) 74a and inclined vertically outward in side view (see FIG. 5B). Note that the fitting point P1 is located on the center axis of the bolt 78a while the fastening point P2 is located on the center axis of the bolt 76 (see FIG. 3).

A suspension system 10a according to a modified example of this embodiment will be described.

Figure 6A:
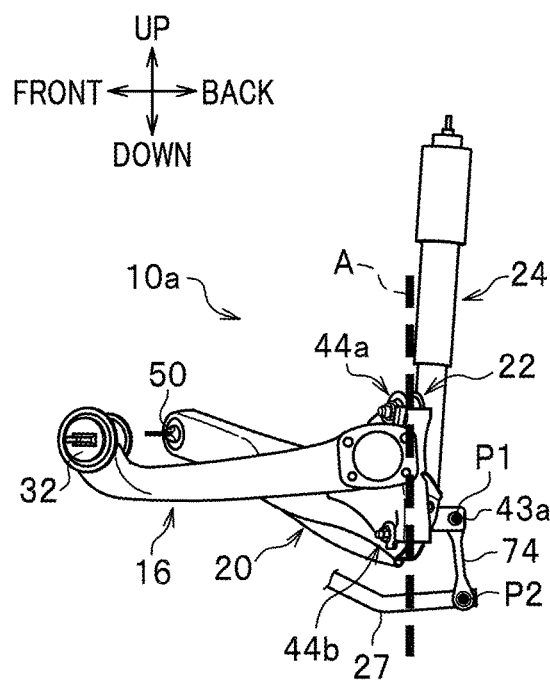
FIG. 6A is a schematic diagram of a suspension system according to a modified example, which shows a positional relation in the vehicle front-back direction between the center axis A of the hinge mechanism and the stabilizer link.
Figure 6B:
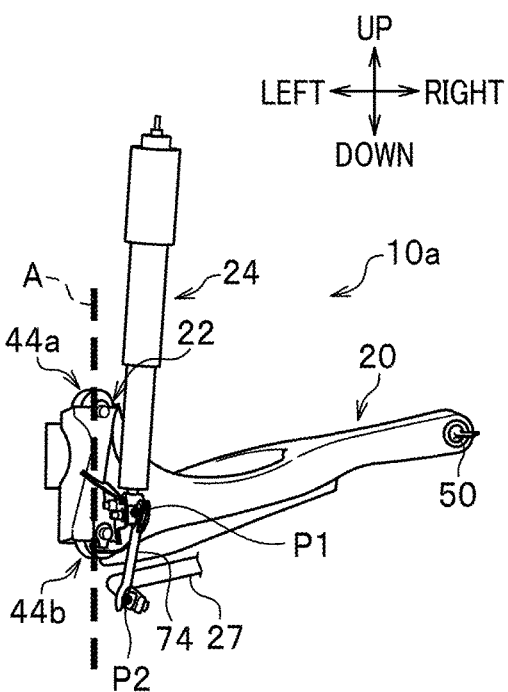
FIG. 6B is a schematic diagram of the suspension system of the modified example, which shows a positional relation in the vehicle width direction between the fitting point P1 and the fastening point P2.

Regarding the suspension system 10a according to the modified example, FIG. 6A is a schematic diagram showing a positional relation in the vehicle front-back direction between the center axis A of the hinge mechanism and the stabilizer link, and FIG. 6B is a schematic diagram showing a positional relation in the vehicle width direction between the fitting point P1 and the fastening point P2. Note that the constituents in FIGS. 6A and 6B which are the same as those in FIGS. 5A and 5B are explained by designating the same reference signs.

The suspension system 10 according to the embodiment shown in FIGS. 5A and 5B is configured such that the fastening point P2 is located above the fitting point P1 in terms of the vertical up-down direction, and is fastened to an end of the stabilizer 27 on the upper end side of the stabilizer link 74. On the other hand, as shown in FIGS. 6A and 6B, the suspension system 10a according to the modified example is different in that the suspension system 10a is configured such that the fastening point P2 is located below the fitting point P1 in terms of the vertical up-down direction, and is fastened to the end of the stabilizer 27 on the lower end side of the stabilizer link 74. Note that the embodiment shown in FIGS. 5A and 5B and the modified example shown in FIGS. 6A and 6B achieve the same stroke toe characteristic as described later.

The suspension system 10 according to the embodiment (as well as the suspension system 10a according to the modified example) is basically configured as described above. Next, operation and effect of the suspension system will be explained. FIG. 7 is a bottom view used for explanation of the operation of the suspension system according to the embodiment. Note that FIG. 7 illustrates the state of the suspension system applied to the right rear wheel, which is viewed from immediately below the vehicle.

In this embodiment, due to the layout of the stabilizer link 74, a component force in a direction of an arrow B is generated by a reactive force of the stabilizer 27 at the time of a bump stroke in a reversed phase, for example. The component force in the direction of the arrow B generates a moment in a clockwise direction (a direction of an arrow C) about the non-illustrated wheel, whereby the right rear wheel 12 is displaced in a toe-in direction. In FIG. 7, the right rear wheel 12 before the displacement is indicated with a solid line and the right rear wheel 12 after the displacement is indicated with a chain double dashed line, respectively.

Specifically, in this embodiment, on the assumption that the fitting point P1 of the stabilizer link 74 is located at the vehicle backside of the center axis A of the hinge mechanism 22, and either when the fastening point P2 is located above the fitting point P1 or when the fastening point P2 is located below the fitting point P1, arranging the lower side of the stabilizer link 74 outward (extending to the left end side) in the vehicle width direction makes it possible to displace the right rear wheel 12 in the toe-in direction by the action of the reactive force of the stabilizer 27 generated at the time of the bump stroke in the reversed phase, for example.

Here, the stabilizer 27 generates the reactive force not only at the time of the bump stroke, but also when a braking force is applied at the time of braking, and when a lateral force is applied to the vehicle, for example. In the meantime, the reactive force generated by the stabilizer 27 is increased when the right and left rear wheels 12 have phases reversed to each other. However, application of a small reactive force by the stabilizer 27 is also included in the case of generation of the reactive force even when the right and left rear wheels 12 have the same phase, for example.

As described above, this embodiment improves the stroke toe characteristic without requiring a layout change and the like. In other words, in this embodiment, the use of the reactive force of the stabilizer 27 makes it possible to achieve a larger stroke toe characteristic than the stroke toe characteristic designed (determined) by the layout.

Moreover, in this embodiment, the stroke toe characteristic can be changed by the reactive force of the stabilizer 27. Accordingly, it is possible to increase the degree of freedom in designing a vehicle cabin. Furthermore, in this embodiment, it is possible to further improve driving stability of the vehicle by securing the toe-in characteristic at the time of a stroke.

What is claimed is:

1. A semi-trailing arm suspension system, comprising:
   a trailing arm turnably connected to a chassis;
   a trailing bush interposed between the chassis and the trailing arm and configured to pivotally and turnably support the trailing arm;
   a lower arm turnably connected to the chassis;
   a lower arm bush interposed between the chassis and the lower arm and configured to pivotally and turnably support the lower arm;
   a hinge mechanism configured to join the trailing arm and the lower arm in such a way as to be displaceable relative to each other;
   a shaft-shaped stabilizer provided with a bent part; and
   a stabilizer link interposed between the trailing arm and the stabilizer and configured to connect the stabilizer to the trailing arm, wherein
   one end of the stabilizer link is fastened to an end part of the stabilizer and another end of the stabilizer link is fitted on the trailing arm,
   a fitting point of the stabilizer link to the trailing arm is located behind a center axis of the hinge mechanism in a vehicle front-back direction, and
   a fastening point of the stabilizer and the stabilizer link is located above the fitting point in a vehicle up-down direction and inside the fitting point in a vehicle width direction.

2. A semi-trailing arm suspension system, comprising:
   a trailing arm turnably connected to a chassis;
   a trailing bush interposed between the chassis and the trailing arm and configured to pivotally and turnably support the trailing arm;
   a lower arm turnably connected to the chassis;
   a lower arm bush interposed between the chassis and the lower arm and configured to pivotally and turnably support the lower arm;
   a hinge mechanism configured to join the trailing arm and the lower arm in such a way as to be displaceable relative to each other;
   a shaft-shaped stabilizer provided with a bent part; and
   a stabilizer link interposed between the trailing arm and the stabilizer and configured to connect the stabilizer to the trailing arm, wherein
   one end of the stabilizer link is fastened to an end part of the stabilizer and another end of the stabilizer link is fitted on the trailing arm,
   a fitting point of the stabilizer link to the trailing arm is located behind a center axis of the hinge mechanism in a vehicle front-back direction, and
   a fastening point of the stabilizer and the stabilizer link is located below the fitting point in a vehicle up-down direction and inside the fitting point in a vehicle width direction.

* * * * *